C. K. LASSITER & F. E. BOCORSELSKI.
TOOL HOLDER.
APPLICATION FILED APR. 3, 1912.
1,038,158.
Patented Sept. 10, 1912.
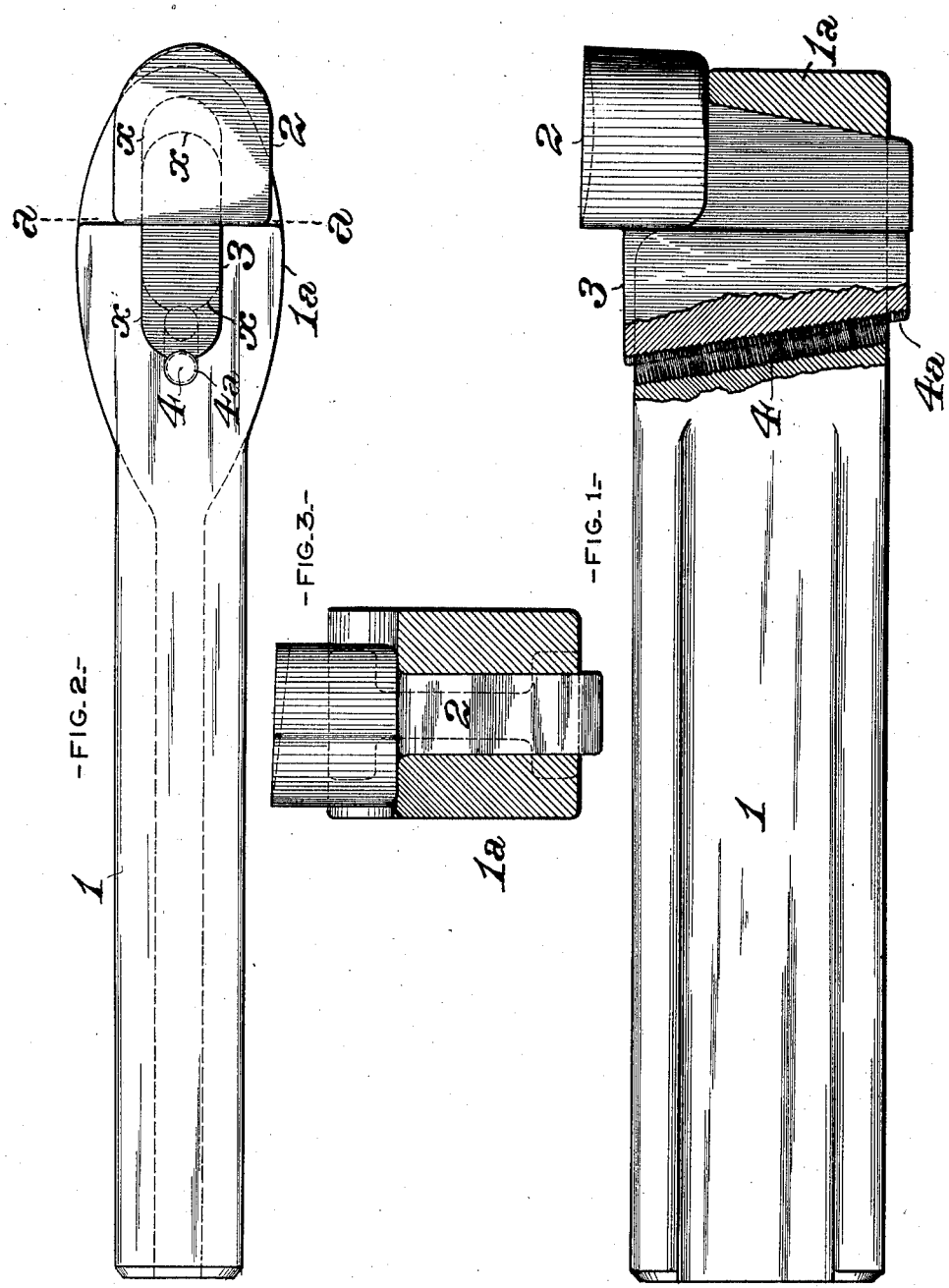

UNITED STATES PATENT OFFICE.

COLUMBUS K. LASSITER AND FRANK E. BOCORSELSKI, OF RICHMOND, VIRGINIA.

TOOL-HOLDER.

1,038,158.  Specification of Letters Patent.  Patented Sept. 10, 1912.

Application filed April 3, 1912. Serial No. 688,177.

*To all whom it may concern:*

Be it known that we, COLUMBUS K. LASSITER and FRANK E. BOCORSELSKI, both of Richmond, in the county of Henrico and State of Virginia, have invented a certain new and useful Improvement in Tool-Holders, of which improvement the following is a specification.

Our invention relates to means for holding cutting tools, more particularly those which are made of "high speed" steel and which are required to make comparatively heavy cuts at high cutting speeds, in operative position in lathes and planers, and its object is to provide an appliance of such type which shall be of simple, inexpensive, and substantial construction, and which shall enable the accurate adjustment of the position of the cutting tool to be readily effected, as may, from time to time, become necessary or desirable.

The improvement claimed is hereinafter fully set forth.

In the accompanying drawings: Figure 1 is a side view, partly in section, of a tool holder embodying our invention; Fig. 2, a plan or top view of the same; and, Fig. 3, a transverse section, on the line $a\ a$ of Fig. 2.

In the practice of our invention, we provide a tool holder which is preferably made of low carbon or billet steel, and may be case-hardened, if desired, and which comprises a shank or body, 1, shown in this instance as of I section, in order to combine strength and lightness, and an integral head, 1ª, located at one end of the shank, in which head there is formed a tool carrying slot, perpendicular to the horizontal or longitudinal plane of the shank, the boundaries of which slot are shown by the full and dotted lines $x, x, x, x$, in Fig. 2, and the ends of which slot are oppositely inclined, at equal angles, to the horizontal plane of the tool holder, their inclination being, in practice, about 80 degrees to said plane.

A bit or cutting tool, 2, of high speed steel, the head of which is forged, in the usual manner, to any shape desired for cutting metal in a lathe or planer, is fitted in the slot of the head, 1ª, of the tool holder, the front of the body of the tool being inclined correspondingly with, and abutting against, the outer end of said slot, and the back of the body of the tool being flat and vertical and abutting against the front of a wedge, 3, the opposite side of which is inclined correspondingly with, and abuts against, the inner end of the slot, and which clamps the body of the tool therein.

The cutting tool, 2, and wedge, 3, are held firmly in any position in which they may be vertically adjusted in the slot of the tool holder head, by a locking screw, 4, which engages an internal thread, 4ª, cut partly in the head of the tool holder and partly in the adjacent portion of the wedge, 3, said screw, when engaged with the internally threaded portions of the wedge and the tool holder head, preventing movement of the wedge and tool, or either of them, from the position in which the tool may be adjusted for operation.

It will be seen that, under the construction above described, the cutting tool may be raised and lowered to accurately suit the work on which it is to operate, with great facility whenever required, and that in any adjusted position, it is firmly clamped and held by the wedge when driven tight, the movement of the wedge being, in turn, prevented by the locking screw so long as the latter is permitted to remain in engagement with the wedge and tool holder. The complete appliance, ready for operation, can be made at a small fraction of the cost of a high speed tool having an integral shank of proper size and proportions to provide for its support in a lathe or planer, and presents all the operative advantages of a tool of such expensive construction.

We claim as our invention and desire to secure by Letters Patent:—

1. The combination with a cutter-holder, comprising a shank and a head integral therewith, the latter having a slot passing therethrough, the sides of said slot being parallel and the ends concave and converging, of a metal-cutting tool fitting in and abutting one end of said slot, a wedge fitting in and abutting the other end of said slot, the adjacent faces of said tool and wedge contacting, and a locking-screw engaging threads formed partially in said wedge and partly in the adjacent end of said slot.

2. The combination with a cutter-holder, comprising an integral shank and head, the latter having a slot passing therethrough at right angles to the axis of the shank, the ends of which slot converge at equal angles, of a metal-cutting tool fitting in one end of said slot, a wedge fitting in the other end and abutting said tool, and a locking screw engaging threads formed partially in said wedge and partially in the adjacent end of said slot.

COLUMBUS K. LASSITER.
FRANK E. BOCORSELSKI.

Witnesses:
A. B. WARREN,
A. H. WARD.

Copies of this patent may be obtained for five cents each, by addressing the "Commissioner of Patents, Washington, D. C."